US010187585B2

(12) United States Patent
Guo et al.

(10) Patent No.: US 10,187,585 B2
(45) Date of Patent: Jan. 22, 2019

(54) METHOD FOR ADJUSTING EXPOSURES OF MULTIPLE CAMERA MODULES OF A CAMERA DEVICE

(71) Applicant: NATIONAL CHIAO TUNG UNIVERSITY, Hsinchu (TW)

(72) Inventors: Jiun-In Guo, Hsinchu (TW); Po-Hsiang Huang, Taipei (TW)

(73) Assignee: National Chiao Tung University, Hsinchu (TW)

( * ) Notice: Subject to any disclaimer, the term of this patent is extended or adjusted under 35 U.S.C. 154(b) by 1 day.

(21) Appl. No.: 15/461,129

(22) Filed: Mar. 16, 2017

(65) Prior Publication Data
US 2017/0374257 A1 Dec. 28, 2017

(30) Foreign Application Priority Data

Jun. 23, 2016 (TW) .............................. 105119673 A

(51) Int. Cl.
H04N 5/04 (2006.01)
H04N 5/073 (2006.01)
H04N 5/235 (2006.01)
H04N 5/247 (2006.01)

(52) U.S. Cl.
CPC ............. H04N 5/2352 (2013.01); H04N 5/04 (2013.01); H04N 5/0733 (2013.01); H04N 5/247 (2013.01)

(58) Field of Classification Search
CPC ...... H04N 5/2352; H04N 5/0733; H04N 5/04; H04N 5/247
See application file for complete search history.

(56) References Cited

U.S. PATENT DOCUMENTS

| 8,305,487 | B2* | 11/2012 | Cha ...................... H04N 5/2353 348/222.1 |
| 9,674,455 | B1* | 6/2017 | Wright, Jr. ........... H04N 5/2352 |
| 2014/0198218 | A1* | 7/2014 | Afrooze ................. H04N 5/235 348/164 |
| 2015/0264273 | A1* | 9/2015 | Feder ................. H04N 5/35554 348/239 |
| 2018/0115683 | A1* | 4/2018 | Lee ...................... H04N 5/2353 |

FOREIGN PATENT DOCUMENTS

| TW | 201334524 A1 | 8/2013 |
| TW | 201349176 A | 12/2013 |

* cited by examiner

Primary Examiner — Gevell V Selby
(74) Attorney, Agent, or Firm — Fish & Richardson P.C.

(57) ABSTRACT

A method for adjusting exposure of a camera device is provided to include steps of: using first to $M^{th}$ camera modules to continuously capture images in sync; reducing an exposure value of the first camera module according to a first current image captured at a latest time point by the first camera module until a first condition associated with the first current image is met; adjusting an exposure value of an $i^{th}$ camera module according to an $i^{th}$ current image, which is captured at the latest time point by the $i^{th}$ camera module, and an $(i-1)^{th}$ previous image, which is captured at a time point immediately previous to the latest time point by an $(i-1)^{th}$ camera module.

20 Claims, 3 Drawing Sheets

METHOD FOR ADJUSTING EXPOSURES OF MULTIPLE CAMERA MODULES OF A CAMERA DEVICE

CROSS-REFERENCE TO RELATED APPLICATION

This application claims priority of Taiwanese Patent Application No. 105119673, filed on Jun. 23, 2016.

FIELD

The disclosure relates to a camera device, and more particularly to a method for adjusting exposure of a camera device that may capture a plurality of images with different exposure values.

BACKGROUND

In a conventional high dynamic range (HDR) image synthesis method, multiple images that correspond to different exposure values (e.g., −1 EV, 0 EV and +1 EV) are acquired by autobracketing, and are then synthesized to generate an HDR image. However, in some photographing scenes, image quality of the HDR image obtained by the abovementioned method may not be good enough.

SUMMARY

Therefore, an aspect of the disclosure is to provide a method for adjusting exposure of a camera device. The method may be suitable for capturing images in a variety of different scenes.

According to the disclosure, the method includes steps of: (A) providing a camera device that includes first to $M^{th}$ camera modules and a processing module coupled to the first to $M^{th}$ camera modules, where $M \geq 2$; (B) by the first to $M^{th}$ camera modules, continuously capturing images of a scene in sync, and providing the images thus captured to the processing module, each of the images being composed of a plurality of pixels, each of which has a pixel value; (C) by the processing module, reducing, upon receipt of a first current image captured at a latest time point by the first camera module, an exposure value of the first camera module according to the first current image until a first condition associated with the first current image is met; (D) by the processing module, adjusting, upon receipt of an $i^{th}$ current image, an exposure value of the $i^{th}$ camera module according to the $i^{th}$ current image and an $(i-1)^{th}$ previous image, wherein the $i^{th}$ current image is captured at the latest time point by the $i^{th}$ camera module, and the $(i-1)^{th}$ previous image is captured at a time point immediately previous to the latest time point by an $(i-1)^{th}$ camera module, where $2 \leq i \leq M$; (E) repeating step (C) until a first condition associated with the first current image is met; and (F) repeating step (D) until a second condition associated with the $i^{th}$ current image and the $(i-1)^{th}$ previous image is met.

Another aspect of the disclosure is to provide a camera device that implements the method of this disclosure.

According to the disclosure, the camera device includes first to $M^{th}$ camera modules configured to continuously capture images of a scene in sync, and a processing module coupled to the first to $M^{th}$ camera modules for receiving the images captured thereby, where $M \geq 2$.

Each of the images captured by the first to $M^{th}$ camera modules is composed of a plurality of pixels, each of which has a pixel value.

The processing module is configured to perform a first process of reducing, upon receipt of a first current image captured at a latest time point by the first camera module, an exposure value of the first camera module according to the first current image, and to perform a second process of adjusting, upon receipt of an $i^{th}$ current image, an exposure value of the $i^{th}$ camera module according to the $i^{th}$ current image and an $(i-1)^{th}$ previous image, where $2 \leq i \leq M$. The $i^{th}$ current image is captured at the latest time point by the $i^{th}$ camera module, and the $(i-1)^{th}$ previous image is captured at a time point immediately previous to the latest time point by an $(i-1)^{th}$ camera module.

The processing module is further configured to repeat performing the first process until a first condition associated with the first current image is met, and to repeat performing the second process until a second condition associated with the $i^{th}$ current image and the $(i-1)^{th}$ previous image is met.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
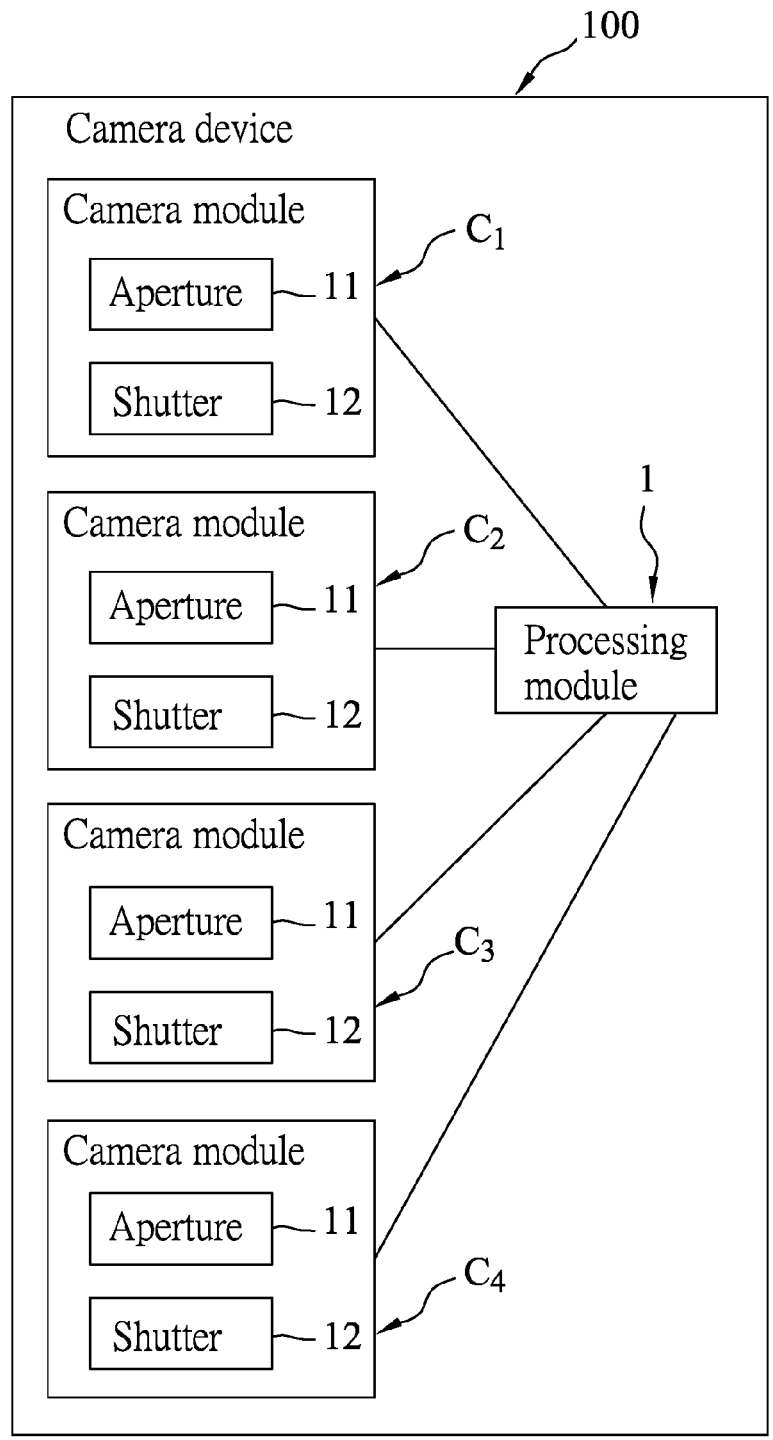
FIG. 1 is block diagram illustrating an embodiment of a camera device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, the embodiment of a camera device 100 according to this disclosure is shown to include first to $M^{th}$ camera modules each having an aperture 11 and a shutter 12, and a processing module 1 coupled to the camera modules, where $M \geq 2$. In this embodiment, M=4, and the first to fourth camera modules are respectively denoted as $C_1$, $C_2$, $C_3$ and $C_4$, but this disclosure is net limited thereto.

In this embodiment, the camera modules ($C_1$-$C_4$) are realized in a form of a microlens array, and the aperture 11 of each of the camera modules ($C_1$-$C_4$) is a variable aperture, but this disclosure is not limited thereto. The camera modules ($C_1$-$C_4$) are configured to continuously capture images of a scene in sync according to respective exposure values thereof. The exposure value of each of the camera modules ($C_1$-$C_4$) may be adjusted by the processing module 1 adjusting at least one of an aperture and an exposure time (i.e., shutter speed) of the camera module ($C_1$-$C_4$).

The processing module 1 continuously receives the images captured by the camera modules ($C_1$-$C_4$), and continuously performs a first process and a second process. In the first process, the processing module 1 reduces, upon receipt of a first current image captured at a latest time point by the camera module ($C_1$), the exposure value of the camera module ($C_1$) according to the first current image. In the second process, the processing module 1 adjusts, upon receipt of an $i^{th}$, current image, the exposure value of the camera module ($C_1$) according to the $i^{th}$ current image and an $(i-1)^{th}$ previous image, where $2 \leq i \leq M$, the $i^{th}$ current image is captured at the latest time point by the camera module ($C_i$), and the $(i-1)^{th}$ previous image is captured at a time point immediately previous to the latest time point by the camera module ($C_{i-1}$). The processing module 1 is configured to repeat performing the first process until a first condition associated with the first current image is met, and to repeat performing the second process until a second condition associated with the $i^{th}$ current image and the $(i-1)^{th}$ previous image is met. The first condition is that a pixel value of each of the pixels of the first current image is smaller than a first predetermined pixel value, and the second condition is that a difference between a first pixel quantity ($N_i^t$) and a second pixel quantity ($N_{i-1}^{t-1}$)) is less than a first predetermined pixel quantity ($N_{P1}$), where the first pixel quantity ($N_i^t$) represents a number of the pixels of the $i^{th}$ current image whose pixel values are greater than a second predetermined pixel value, and the second pixel quantity ($N_{i-1}^{t-1}$) represents a number of the pixels of the $(i-1)^{th}$ previous image whose pixel values are greater than a third predetermined pixel value.

Figure 2:
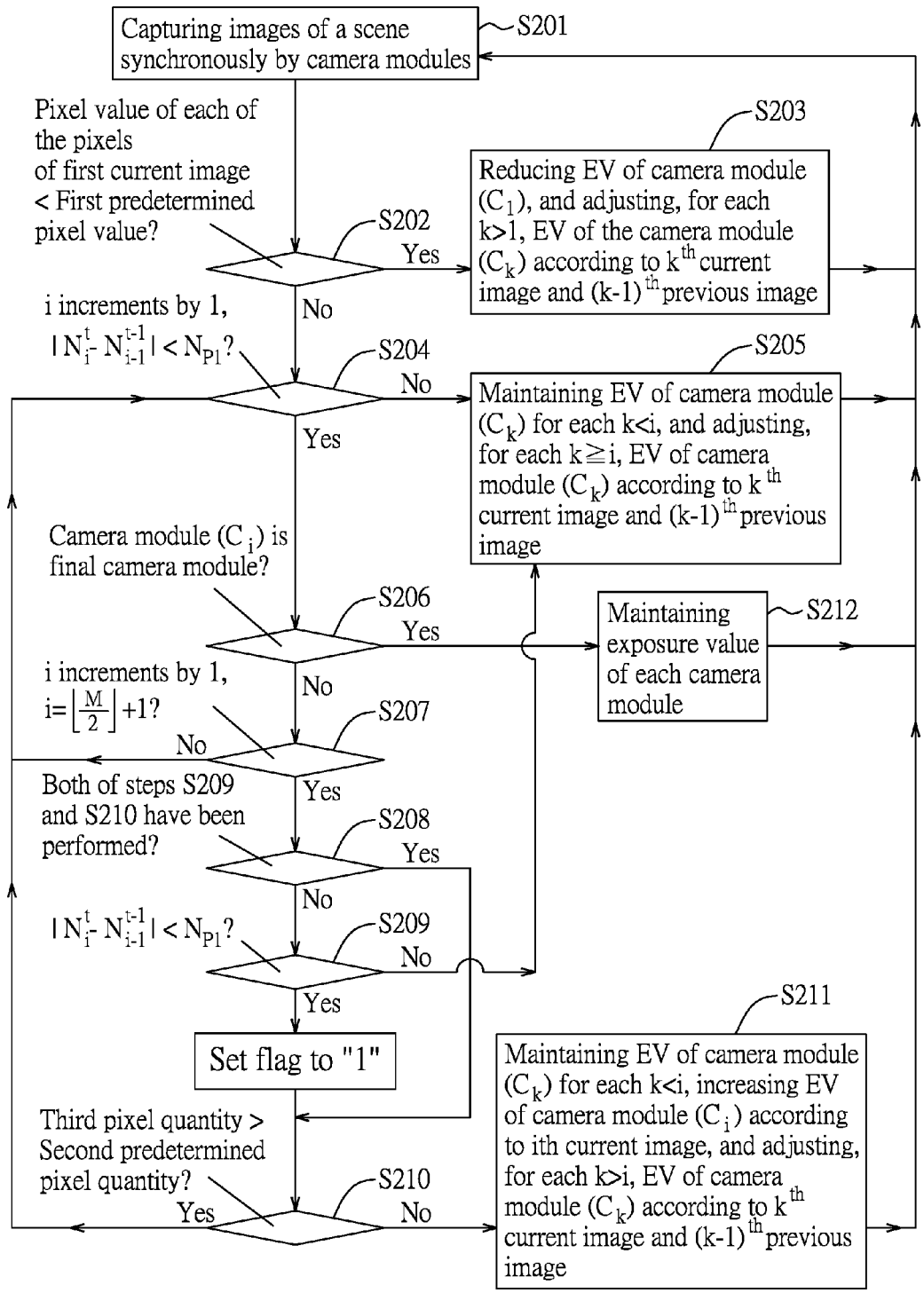
FIG. 2 is a flow chart illustrating steps of an embodiment, of a method for adjusting exposure of the camera device according to the disclosure.

Referring to FIG. 2, the embodiment of a method for adjusting exposure value of the camera device 100 according to disclosure is described in a general form.

In step S201, the first to $M^{th}$ camera modules capture images of a scene synchronously, and the processing module 1 receives the images, and the flow goes to step S202. In step S201, the processing module 1 may use a conventional method to generate an HDR image according to the images thus captured.

In step S202, the processing module 1 determines whether or not the pixel value of each of the pixels of the first current image is smaller than the first predetermined pixel value. The flow goes to step S203 when the determination is negative, and goes to step S204 when otherwise. In this step, an indicator "i" is set to be 1.

In step S203, the processing module 1 reduces the exposure value of the camera module ($C_1$), and adjusts, for each $M \geq k > 1$, the exposure value of the camera module ($C_k$) according to the $k^{th}$ current image and the $(k-1)^{th}$ previous image, and the flow goes back to step S201. In detail, the processing module 1 reduces the exposure value of the camera module ($C_k$) when $(N_k^t - N_{k-1}^{t-1}) \geq N_{P1}$, increases the exposure value of the camera module ($C_k$) when $(N_{k-1}^{t-1} - N_k^t) \geq N_{P1}$, and maintains the exposure value of the camera module ($C_k$) when otherwise.

In step S204, the indicator "i" goes to the next number (increment by one), and the processing module 1 determines whether or not $|N_i^t - N_{i-1}^{t-1}| < N_{P1}$. The flow goes to step S205 when the determination is negative, and goes to step S206 when otherwise.

In step S205, the processing module 1 maintains the exposure value of the camera module ($C_k$) for each $k < i$, and adjusts, for each $k \geq i$, the exposure value of the camera module ($C_k$) according to the $k^{th}$ current image and the $(k-1)^{th}$ previous image, and the flow goes back to step S201. In detail, for each $k > i$, the processing module 1 reduces the exposure value of the camera module ($C_k$) when $(N_k^t - N_{k-1}^{t-1}) \geq N_{P1}$, increases the exposure value of the camera module ($C_k$) when $(N_{k-1}^{t-1} - N_k^t) \geq N_{P1}$, and maintains the exposure value of the camera module ($C_k$) when otherwise.

In step S206, the processing module 1 determines whether or not the camera module ($C_i$) is the final camera module (i.e., determining whether or not i=M). When the determination is negative, the flow goes to step S207. When otherwise, the processing module 1 maintains the exposure value of each of the camera modules ($C_1$-$C_M$) in step S212, and the flow then goes back to S201.

In step S207, the indicator "i" goes to the next number (increment by one), and the processing module 1 determines whether or not $$i = \left\lfloor \frac{M}{2} \right\rfloor + 1.$$

The flow goes to goes to step S204 when otherwise.

In step S208, the processing module 1 determines whether or not a specific procedure has been performed. In this embodiment, the specific procedure refers to steps S209 and S210, which will be described hereinafter. The processing module 1 may make the determination by use of a flag value. The flag value of "0" may represent that not both of the steps S209 and S210 have been performed, and the flow goes to step S209 when the flag value is "0". The flag value of "1" may represent that both of the steps S209 and S210 have been performed, and the flow goes to step S210 when the flag value is "1". Accordingly, the flag value may have an initial value of "0". However, the disclosure is not limited to such.

In step S209, for $$i = \left\lfloor \frac{M}{2} \right\rfloor + 1,$$

the processing module 1 determines whether or not $|N_i^t - N_{i-1}^{t-1}| < N_{P1}$. When the determination is negative, the flow goes to step S205. When otherwise, the processing module 1 sets the flag value to "1", and the flow goes to step S210.

In step S210, the processing module 1 determines whether or not a third pixel quantity is greater than a second predetermined pixel quantity. The third pixel quantity represents a number of the pixels of the $i^{th}$ current image whose pixel values are greater than the third predetermined pixel value, where $$i = \left\lfloor \frac{M}{2} \right\rfloor + 1.$$

The flow goes to step S211 when the determination is negative, and goes back to step S204 when otherwise.

In step S211, the processing module 1 maintains the exposure value of the camera module ($C_k$) for each $k < i$, increases the exposure value of the camera module ($C_i$) according to the $i^{th}$ current image, and adjusts, for each $k > i$, the exposure value of the camera module ($C_k$) according to the $k^{th}$ current image and the $(k-1)^{th}$ previous image, and the flow goes back to step S201. In detail, for each $k > i$, the processing module 1 reduces the exposure value of the camera module ($C_k$) when $(N_k^t - N_{k-1}^{t-1}) \geq N_{P1}$, increases the exposure value of the camera module ($C_k$) when $(N_{k-1}^{t-1} - N_k^t) \geq N_{P1}$, and maintains the exposure value of the camera module ($C_k$) when otherwise.

Hereinafter, the embodiment of the method is exemplified step by step with M=4.

In step S201, the camera modules ($C_1$-$C_4$) capture images of a scene synchronously, the processing module 1 receives the images, and the flow goes to step S202. The processing module 1 may use a conventional method to generate an HDR image according to the images thus captured in step S201.

In step S202, the processing module 1 determines whether or not the pixel value of each of the pixels of the first current image is smaller than the first predetermined pixel value (e.g., 229.5). The flow goes to step S203 when the determination is negative, and goes to step S204 when otherwise. In this step, the indicator (i) is set to be 1.

In step S203, the processing module 1 reduces the exposure value of the camera module ($C_1$), adjusts the exposure value of the camera module ($C_2$) according to the second current image and the first previous image, adjusts the exposure value of the camera module ($C_3$) according to the third current image and the second previous image, and adjusts the exposure value of the camera module ($C_4$) according to the fourth current image and the third previous image. In detail, the processing module 1 reduces the exposure value of the camera module ($C_2$) if $(N_2^t - N_1^{t-1}) \geq N_{P1}$, increases the exposure value of the camera module ($C_2$) if $(N_1^{t-1} - N_2^t) \geq N_{P1}$, and maintains the exposure value of the camera module ($C_2$) when otherwise; the processing module 1 reduces the exposure value of the camera module ($C_3$) if $(N_3^t - N_2^{t-1}) \geq N_{P1}$, increases the exposure value of the camera module ($C_3$) if $(N_2^{t-1} - N_3^t) \geq N_{P1}$, and maintains the exposure value of the camera module ($C_3$) when otherwise; and the processing module 1 reduces the exposure value of the camera module ($C_4$) if $(N_4^t - N_3^{t-1}) \geq N_{P1}$, increases the exposure value of the camera module ($C_4$) if $(N_3^{t-1} - N_4^t) \geq N_{P1}$, and maintains the exposure value of the camera module ($C_4$) when otherwise. Then, the flow goes back to step S201. By cooperation of steps S202 and S203, the exposure value of the camera module ($C_1$) is continuously reduced until the pixel value of each of the pixels of the first current image is smaller than the first predetermined pixel value (i.e., meeting the first condition). In this example, the second predetermined pixel value is 170.8, and the third predetermined pixel value is 25.5. That is to say, $N_2^t$ is the number of the pixels of the second current image whose pixel values are greater than 170.8, and $N_1^{t-1}$ is the number of the pixels of the first previous image whose pixel values are greater than 25.5, and so on. In addition, the first predetermined pixel quantity ($N_{P1}$) in this example is 0.25% of a total number of the pixels of the $i^{th}$ current image for $2 \leq i \leq 4$. In this example, since the images captured by the camera modules ($C_1$-$C_4$) have the same number of pixels (i.e., the same resolution), the first predetermined pixel quantity ($N_{P1}$) is fixed.

In step S204, the indicator (i) becomes 2, and the processing module 1 determines whether or not $|N_2^t - N_1^{t-1}| < N_{P1}$. The flow goes to step S205 when the determination is negative, and goes to step S206 when otherwise.

In step S205, the processing module 1 maintains the exposure value of the camera module ($C_1$), adjusts the exposure value of the camera module ($C_2$) according to the second current image and the first previous image, adjusts the exposure value of the camera module ($C_3$) according to the third current image and the second previous image, and adjusts the exposure value of the camera module ($C_4$) according to the fourth current image and the third previous image. Since the adjustment of the exposure value of each of the camera modules ($C_2$-$C_4$) has been described in step S203, details thereof are not repeated herein for the sake of brevity. Then, the flow goes back to step S201. By cooperation of steps S204 and S205, the exposure value of the camera module ($C_2$) is continuously adjusted until $|N_2^t - N_1^{t-1}| < N_{P1}$ (i.e., meeting the second condition for i=2).

In step S206, the processing module 1 determines that the camera module ($C_2$) is not the final camera module and the flow goes to step S207.

In step S207, the indicator (i) becomes 3, and since $$i = 3 = \left\lfloor \frac{4}{2} \right\rfloor + 1,$$

the flow goes to step S208. In step S208, since the flag value is the initial value of "0", the flow goes to step S209.

In step S209, the processing module 1 determines whether or not $|N_3^t - N_2^{t-1}| < N_{P1}$. When the determination is negative, the flow goes to step S205. When otherwise, the processing module 1 sets the flag value to "1", and the flow goes to step S210. By cooperation of steps S203, S209 and S205, the exposure value of the camera module ($C_3$) is continuously adjusted until $|N_3^t - N_2^{t-1}| < N_{P1}$ (i.e., meeting the first condition for i=3).

In step S210, the processing module 1 determines whether or not the number of the pixels of the third current image whose pixel values are greater than the third predetermined pixel value is greater than the second predetermined pixel quantity (e.g., 50% of the total number of the pixels of the third current image). The flow goes to step S211 when the determination is negative.

In step S211, the processing module 1 maintains the exposure value of the camera module ($C_1$), maintains the exposure value of the camera module ($C_2$), increases the exposure value of the camera module ($C_3$) according to the third current image, and adjusts the exposure value of the camera module ($C_4$) according to the fourth current image and the third previous image. Since the adjustment of the exposure value of the camera module ($C_4$) has been described in step S203, details thereof are not repeated herein for the sake of brevity. Then, the flow goes back to step S201. By cooperation of steps S210 and S211, the exposure value of the camera module ($C_3$) is continuously increased until the number of the pixels of the third current image whose pixel values are greater than the third predetermined pixel value is greater than the second predetermined pixel quantity.

In step S210, when the determination is affirmative, the flow goes back to step S204 (denoted as S204(2) hereinafter) in which the processing module 1 determines whether or not $|N_4^t - N_3^{t-1}| < N_{P1}$. The flow goes to step S205 (denoted as S205(2)) when the determination is negative.

In step S205(2), the processing module 1 maintains the exposure value of the camera module ($C_1$), maintains the exposure value of the camera module ($C_2$), maintains the exposure value of the camera module ($C_3$), and adjusts the exposure value of the camera module ($C_4$) according to the fourth current image and the third previous image. Since the adjustment of the exposure value of the camera module ($C_4$) has been described in step S203, details thereof are not repeated herein for the sake of brevity. By cooperation of steps S204 and S205, the exposure value of the camera module ($C_4$) is continuously adjusted until $|N_4^t - N_3^{t-1}| < N_{P1}$ (i.e., meeting the second condition for i=4).

In step S204(2), when the determination is affirmative, the flow goes to step S206 (denoted as S206(2) hereinafter). In step S206(2), the processing module 1 determines that the camera module ($C_4$) is the final camera module, and the flow goes to step S212 in which the processing module 1 maintains the exposure value of each of the camera modules ($C_1$-$C_4$), and the flow then goes back to S201 in which the processing module 1 may generate an HDR image using the conventional method from images taken by the camera modules ($C_1$-$C_4$) with the current exposure values.

Figure 3:
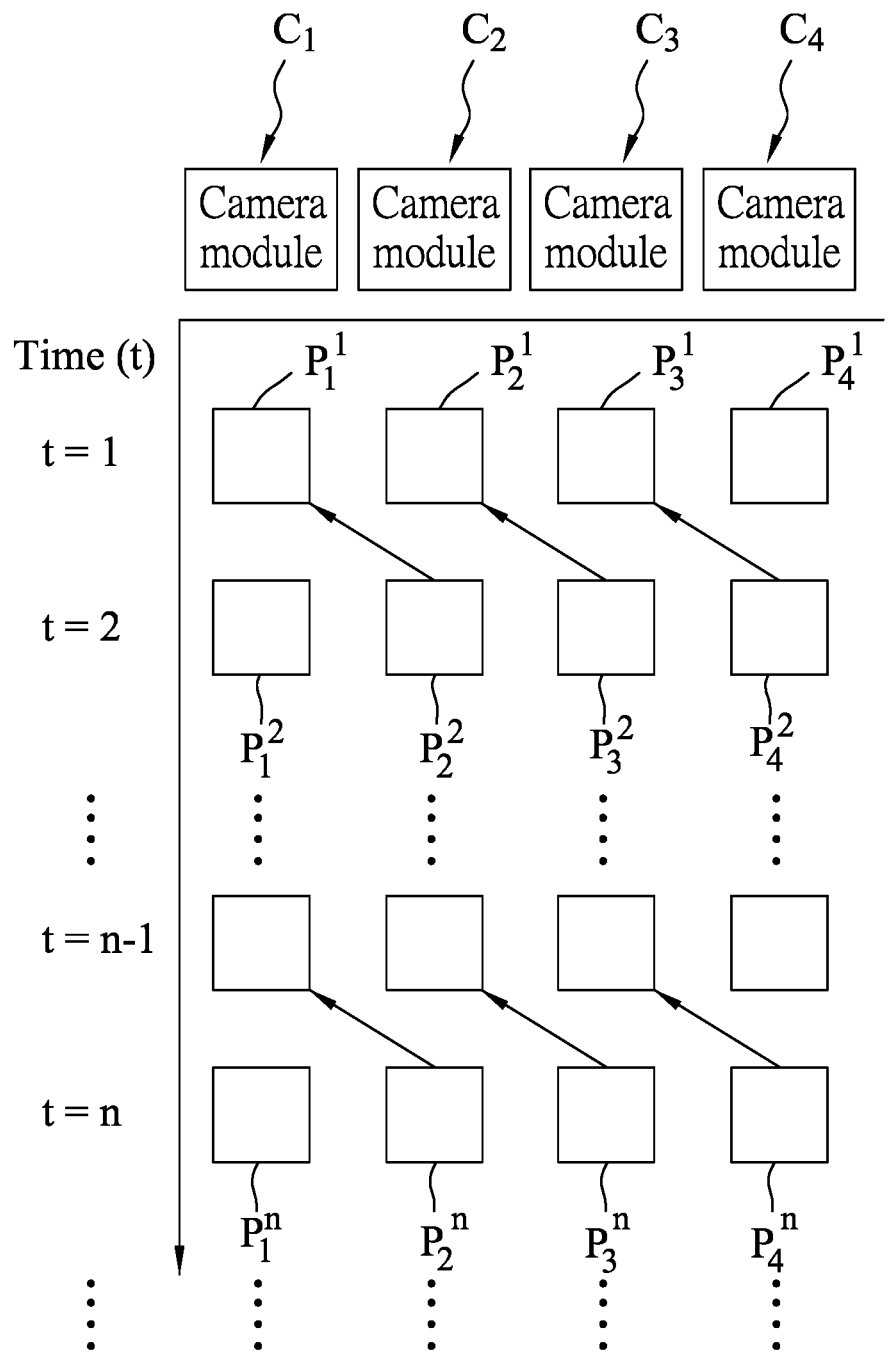
FIG. 3 is a schematic diagram illustrating the embodiment of the method with respect to multiple time points.

FIG. 3 exemplifies the embodiment implemented by the processing module 1 (see FIG. 1) and the camera modules ($C_1$-$C_4$) with respect to multiple time points.

At the first time point (i.e., t=1), the camera modules ($C_1$-$C_4$) synchronously capture and transmit images ($P_1^1$-$P_4^1$) of a scene to the processing module 1. The processing module 1 then generates an HDR image ($HDR^1$) (not shown) according to the images ($P_1^1$-$P_4^1$), and may reduce the exposure value of the camera module ($C_1$) according to the image ($P_1^1$), adjust the exposure value of the camera module ($C_2$) according to the images ($P_1^1$, $P_2^1$), adjust the exposure value of the camera module ($C_3$) according to the images ($P_2^1$, $P_3^1$), and adjust the exposure value of the camera module ($C_4$) according to the images ($P_3^1$, $P_4^1$) since there is no "previous image" at this time point.

At the second time point (i.e., t=2), the camera modules ($C_1$-$C_4$) synchronously capture images ($P_1^2$-$P_4^2$) of the scene according to the exposure values thus adjusted, and transmit the images ($P_1^2$-$P_4^2$) to the processing module 1. The processing module 1 then generates an HDR image ($HDR^2$) according to the images ($P_1^2$-$P_4^2$), and may reduce the exposure value of the camera module ($C_1$) according to the image ($P_1^2$), adjust the exposure value of the camera module ($C_2$) according to the images ($P_1^1$, $P_2^2$), adjust the exposure value of the camera module ($C_3$) according to the images ($P_2^1$, $P_3^2$), and adjust the exposure value of the camera module ($C_4$) according to the image ($P_3^1$, $P_4^2$). In a case where the scene has a constant light source, the exposure value of the camera module ($C_1$) would be the first one to approach a stable state in which the pixel value of each of the pixels of the image captured by the camera module ($C_1$) is smaller than the first predetermined pixel value. Then, the exposure value of the camera module ($C_2$) is gradually adjusted to a stable state in which $|N_2^t - N_1^{t-1}| < N_{P1}$ following the exposure value of the camera module ($C_1$), and so on. Such adjustment of the exposure values would be repeated until the $n^{th}$ time point (i.e., t=n) at which the pixel value of each of the pixels of the image ($P_1^n$) is smaller than the first predetermined pixel value, $|N_2^n - N_1^{n-1}| < N_{P1}$, $|N_3 - N_2^{n-1}| < N_{P1}$ and $|N_4^n - N_3^{n-1}| < N_{P1}$, and the processing module 1 then generates and HDR image ($HDR^n$) according to the images ($P_1^n$-$P_4^n$). When t=n, the image ($P_1^n$) may provide more detail about brighter portions of the scene, and the images ($P_3^n$, $P_4^n$) may provide more detail about darker portions of the scene.

In summary, the method for adjusting exposure of the camera device 100 may adjust the exposure values of the camera modules ($C_1$-$C_M$) based on the light condition of the to-be-captured scene, thereby making the camera device 100 suitable for capturing images of a variety of different scenes.

It is noted that, in the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment (s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for adjusting exposure of a camera device, said method comprising steps of:
   (A) providing a camera device that includes first to $M^{th}$ camera modules and a processing module coupled to the first to $M^{th}$ camera modules, where M≥2;
   (B) by the first to $M^{th}$ camera modules, continuously capturing images of a scene in sync, and providing the images thus captured to the processing module, each of the images being composed of a plurality of pixels, each of which has a pixel value;
   (C) by the processing module, reducing, upon receipt of a first current image captured at a latest time point by the first camera module, an exposure value of the first camera module according to the first current image until a first condition associated with the first current image is met;
   (D) by the processing module, adjusting, upon receipt of an $i^{th}$ current image, an exposure value of the $i^{th}$ camera module according to the $i^{th}$ current image and an $(i-1)^{th}$ previous image, wherein the t current image is captured at the latest time point by the $i^{th}$ camera module, and the $(i-1)^{th}$ previous image is captured at a time point immediately previous to the latest time point by the $(i-1)^{th}$ camera module, where 2≤i≤M;
   (E) repeating step (C) until the first condition associated with the first current image is met; and
   (F) repeating step (D) until a second condition associated with the $i^{th}$ current image and the $(i-1)^{th}$ previous image is met.

2. The method of claim 1, wherein, in step (C), the processing module reduces the exposure value of the first camera module by adjusting at least one of an aperture and an exposure time of the first camera module; and, in step (D), the processing module adjusts the exposure value of the $i^{th}$ camera module by adjusting at least one of an aperture and an exposure time of the $i^{th}$ camera module.

3. The method of claim 1, wherein the first condition is that the pixel value of each of the pixels of the first current image is smaller than a first predetermined pixel value.

4. The method of claim 1, wherein the second condition is that a difference between a first pixel quantity and a second pixel quantity is less than a first predetermined pixel quantity, where the first pixel quantity represents a number of the pixels of the $i^{th}$ current image the pixel value of each of which is greater than a first predetermined pixel value, and the second pixel quantity is a number of the pixels of the $(i-1)^{th}$ previous image the pixel value of each of which is greater than a second predetermined pixel value.

5. The method of claim 4, further comprising, for $$i = \left[\frac{M}{2}\right] + 1,$$

a step of:

(G) when the second condition is met, repeating step (D) until a third pixel quantity is greater than a second predetermined pixel quantity, where the third pixel quantity represents a number of the pixels of the $i^{th}$ current image the pixel value of each of which is greater than the second predetermined pixel value.

6. The method of claim 1, further comprising, after steps (E) and (F), a step of: (G) generating a final image according to the images captured at the latest time point respectively by the first to $M^{th}$ camera modules.

7. The method of claim 1, wherein the first condition is that the pixel value of each of the pixels of the first current image is smaller than a first predetermined pixel value, and the second condition is that a difference between a first pixel quantity and a second pixel quantity is less than a first predetermined pixel quantity, where the first pixel quantity represents a number of the pixels of the $i^{th}$ current image the pixel value of each of which is greater than a second predetermined pixel value, and the second pixel quantity represents a number of the pixels of the $(i-1)^{th}$ previous image the pixel value of each of which is greater than a third predetermined pixel value.

8. The method of claim 7, wherein the first predetermined pixel value is 229.5, the second predetermined pixel value is 170.8, and the third predetermined pixel value is 25.5.

9. The method of claim 7, further comprising, for $$i = \left[\frac{M}{2}\right] + 1,$$

a step of:
(G) when the second condition is met, repeating step (D) until a third pixel quantity is greater than a second predetermined pixel quantity, where the third pixel quantity represents a number of the pixels of the $i^{th}$ current image the pixel value of each of which is greater than the third predetermined pixel value.

10. The method of claim 9, wherein the first predetermined pixel quantity is 0.25% of a total number of the pixels of the $i^{th}$ current image for $2 \le i \le M$; and the second predetermined pixel quantity is 50% of the total number of the pixels of the $i^{th}$ current image for $$i = \left[\frac{M}{2}\right] + 1.$$

11. A camera device comprising:
first to $M^{th}$ camera modules configured to continuously capture images of a scene in sync, each of the images being composed of a plurality of pixels, each of which has a pixel value, where $M \ge 2$; and
a processing module coupled to said first to $M^{th}$ camera modules for receiving the images captured thereby, and configured
to perform a first process of reducing, upon receipt of a first current image captured at a latest time point by said first camera module, an exposure value of said first camera module according to the first current image,
to perform a second process of adjusting, upon receipt of an $i^{th}$ current image, an exposure value of said $i^{th}$ camera module according to the $i^{th}$ current image and an $(i-1)^{th}$ previous image,
to repeat performing the first process until a first condition associated with the first current image is met, and
to repeat performing the second process until a second condition associated with the $i^{th}$ current image and the $(i-1)^{th}$ previous image is met,
wherein the $i^{th}$ current image is captured at the latest time point by said $i^{th}$ camera module, and the $(i-1)^{th}$ previous image is captured at a time point immediately previous to the latest time point by said $(i-1)^{th}$ camera module, where $2 \le i \le M$.

12. The camera device of claim 11, wherein, in the first process, said processing module reduces the exposure value of said first camera module by adjusting at least one of an aperture and an exposure time of said first camera module; and, in the second process, said processing module adjusts the exposure value of said $i^{th}$ camera module by adjusting at least one of an aperture and an exposure time of said $i^{th}$ camera module.

13. The camera device of claim 11, wherein the first condition is that the pixel value of each of the pixels of the first current image is smaller than a first predetermined pixel value.

14. The camera device of claim 11, wherein the second condition is that a difference between a first pixel quantity and a second pixel quantity is less than a first predetermined pixel quantity, where the first pixel quantity represents a number of the pixels of the $i^{th}$ current image the pixel value of each of which is greater than a first predetermined pixel value, and the second pixel quantity represents a number of the pixels of the $(i-1)^{th}$ previous image the pixel value of each of which is greater than a second predetermined pixel value.

15. The camera device of claim 14, wherein said processing module is further configured to, for $$i = \left[\frac{M}{2}\right] + 1,$$

repeat performing the second process until a third pixel quantity is greater than a second predetermined pixel quantity when the second condition is met, where the third pixel quantity represents a number of the pixels of the $i^{th}$ current image the pixel value of each of which is greater than the second predetermined pixel value.

16. The camera device of claim 11, wherein said processing module is further configured to generate a final image according to the images captured at the latest time point respectively by said first to $M^{th}$ camera modules after the repetition of performing the first and second processes is completed.

17. The camera device of claim 11, wherein the first condition is that the pixel value of each of the pixels of the first current image is smaller than a first predetermined pixel value, and the second condition is that a difference between a first pixel quantity and a second pixel quantity is less than a first predetermined pixel quantity, where the first pixel quantity represents a number of the pixels of the $i^{th}$ current image the pixel value of each of which is greater than a second predetermined pixel value, and the second pixel quantity represents a number of the pixels of the $(i-1)^{th}$ previous image the pixel value of each of which is greater than a third predetermined pixel value.

18. The camera device of claim 17, wherein the first predetermined pixel value is 229.5, the second predetermined pixel value is 170.8, and the third predetermined pixel value is 25.5.

19. The camera device of claim 17, wherein said processing module is further configured to, for $$i = \left[\frac{M}{2}\right] + 1,$$

repeat performing the second process until a third pixel quantity is more than a second predetermined pixel quantity when the second condition is met, where the third pixel quantity represents a number of the pixels of the $i^{th}$ current image the pixel value of each of which is greater than the third predetermined pixel value.

20. The camera device of claim 19, wherein the first predetermined pixel quantity is 0.25% of a total number of the pixels of the $i^{th}$ current image for $2 \leq i \leq M$; and the second predetermined pixel quantity is 50% of the total number of the pixels of the $i^{th}$ current image for $$i = \left[\frac{M}{2}\right] + 1.$$

\* \* \* \* \*